Patented Aug. 25, 1936

2,052,003

UNITED STATES PATENT OFFICE 2,052,003

COMPOSITIONS OF MATTER AND PETROLEUM PRODUCTS AND METHOD OF MAKING SAME

Orland M. Reiff, Woodbury, N. J., assignor to Socony-Vacuum Oil Company, Incorporated, New York, N. Y., a corporation of New York No Drawing. Application May 23, 1935,
Serial No. 23,025

13 Claims. (Cl. 87—9)

This invention relates to improved pour point depressants or substances capable of lowering the temperature at which a hydrocarbon oil comprising a substantially homogeneous mixture of liquid oils and waxy solids undergoes loss of fluidity. The invention also contemplates the provision of novel compositions of matter.

This invention has among its principal objects the provision of improved pour point depressants and improved products comprising petroleum oils in combination therewith. Other objects and advantages will appear from the more detailed description of my invention set forth herein.

Pour point depressants heretofore known comprise certain alkyl-substituted aromatic hydrocarbons and certain alkyl-substituted chlorinated aromatic hydrocarbons. Of these a few specific alkyl-substituted aromatic hydrocarbons are described in U. S. Patent 1,815,022. I have now discovered that these previously known alkyl-substituted aromatic hydrocarbons, and also others belonging to a class or group hereinafter defined, may be converted into improved or superior pour point depressants by resinifying them by means of resinifying agents, and preferably with a resinifying agent in the presence of or intimately mixed with concentrated sulphuric acid, as a so-called catalyst, and a solvent such as glacial acetic acid, to promote the rapid and complete resinification of the alkyl-substituted aromatic hydrocarbon with the resinifying agent. While various resinifying agents may be employed in this manner in connection with my invention, such as certain aldehydes, sulphur-containing resinifying agents such as elementary sulphur, sulphur chloride; etc., well-known to those skilled in this art, I prefer to employ formaldehyde or its derivatives, such as trioxymethylene, for this purpose for the reason that I thus obtain a superior final product or pour point depressant and also because the resinifying process or reaction takes place more effectively than when the other resinifying agents mentioned above are used. As a general rule, resinifying agents which are capable of resinifying the parent aromatic hydrocarbons are suitable for the uses of this invention; viz., resinification of the alkyl-substituted aromatic hydrocarbons defined herein to produce improved pour point depressants therefrom.

The alkyl-substituted aromatic hydrocarbons referred to above are prepared by subjecting a member of each of two groups of compounds to the Friedel-Crafts synthesis which employs an aluminum chloride catalyst in accordance with well-known processes. The first of these groups of compounds comprises the aromatic hydrocarbons, such as, for example, benzene, toluene, xylene, naphthalene, anthracene, phenanthrene, fluorene, diphenyl, and the like. The second group of compounds comprises the chlorinated aliphatic hydrocarbons of relatively high molecular weight, such as chlorinated petroleum naphthas, kerosenes, heavy oils such as gas oils and lubricants, petrolatum, and crystalline waxes, and/or similar hydrocarbons derived from other sources, but more especially the chlorinated paraffin waxes. The product of this condensation reaction is designated for convenience and referred to herein as heavy alkyl-substituted aromatic hydrocarbons or simply as alkyl-substituted aromatic hydrocarbons.

As one specific example of the method of preparation of these condensation products, I may cite the preparation of a condensation product of naphthalene and paraffin wax. In carrying out my invention I prefer to employ as a starting material for the preparation of the heavy alkyl-substituted aromatic hydrocarbons a crystalline paraffinic petroleum wax having an A. S. T. M. melting point of approximately 130° F. This wax may be chlorinated by melting the wax, holding it at a temperature of approximately 180°–200° F. and bubbling chlorine through it until it has absorbed or combined with about 12% of its weight of chlorine, giving a product approximating a monochloroparaffin, hereinafter referred to as monochlorwax. This reaction may be successfully carried out at any temperature above the melting point of the wax, but I prefer a temperature of about 200° F., since the reaction proceeds more slowly at lower temperatures, and at higher temperatures the product may be darkened.

I then prepare a condensation product of this chlorwax with naphthalene, according to the well-known Friedel-Crafts synthesis with aluminum chloride, using as a representative reaction mixture the specified ingredients in the following proportions:

| | Parts (weight) |
|---|---|
| Monochlorwax | 100 |
| Naphthalene | 10.65 |
| Kerosene | 100 |
| Aluminum chloride | 2 |

The chlorwax in this reaction mixture is prepared by chlorinating paraffin wax as described above. The function of the kerosene in this reaction mixture is to reduce the viscosity of the reaction mixture. The chlorwax, naphthalene and diluent are mixed together at about 100° F. to effect solution, and thereafter the aluminum chloride catalyst is added slowly to avoid excessive foaming due to evolution of hydrochloric acid gas. After all of the aluminum chloride has been added to the mixture the temperature of the mixture is gradually raised to 212° F. and maintained at this temperature until the reaction is substantially complete, requiring ordinarily about one hour. The reaction product is separated from the aluminum chloride by washing with water and alkali, and the product further purified and freed from unreacted wax by heating in a vacuum of about 5 millimeters at a temperature of about 350° C. In connection with the above it will be understood that the diluent (kerosene) used to reduce the viscosity of the reaction mixture may be omitted if desired, in which case it will ordinarily be preferable to effect some reduction in viscosity by operation at a higher temperature, although I have found that the use of substantially higher temperatures tends to reduce the effectiveness of the products, after resinification, as pour point depressants.

I have found, however, that superior pour point depressants can be produced in accordance with this invention when the diluent used in the above described condensation reaction is wax, the temperature of the reaction being maintained above the melting point of the wax. I have found that by substituting wax for the kerosene in the above illustrative example, I am able to produce a pour point depressant (after resinification) of substantially increased effectiveness.

Similar alkyl-substituted aromatic hydrocarbons may be prepared by using different relative concentrations of reagents or ingredients in the reaction mixture. Also other aromatic hydrocarbons may be substituted for the naphthalene and other aliphatic hydrocarbons of relatively high molecular weights may be substituted for the wax, within the scope of the definitions given above.

The alkyl-substituted aromatic hydrocarbons referred to above may be prepared from mixtures of aromatic hydrocarbons and chlorinated aliphatic hydrocarbons containing as little as say 35 grams, or slightly more, of chlorine per gram molecular weight of aromatic compound, corresponding approximately to a mono-substituted aromatic hydrocarbon. Also, they may be prepared from mixtures containing a greater proportion of chlorine, up to a proportion sufficient to saturate the aromatic compound. Mixtures throughout the range just stated result in pour point depressants, made in accordance with this invention, which possess good properties of solubility in petroleum lubricating oils and stability for use in automobile engines.

While I prefer, in the practice of my invention, to employ a chlorwax, or other chlorinated aliphatic hydrocarbon as defined above, containing about 12% chlorine, and corresponding approximately to monochlorwax as specified in the above examples, I may employ other chlorwax containing other proportion of chlorine to the wax, or other aliphatic hydrocarbons, without departing from my invention. Thus I may employ with good results, a chlorinated wax or other chlorinated aliphatic hydrocarbon containing as little as 9% and as much as about 18% of chlorine to the wax or other aliphatic hydrocarbon. If excessively large proportions of chlorine are employed, there is a tendency to reduce the amount of desired aliphatic substituents of relatively high molecular weight and to produce undesirable side reactions.

The alkyl-substituted aromatic hydrocarbon; e. g., wax-substituted naphthalene, is next subjected in accordance with my invention to a condensing or resinifying reaction with a resinifying agent, a preferred agent being trioxymethylene, the preferred reaction mixture employed for this purpose being as follows:

Wax-substituted naphthalene_ 50 grams
Glacial acetic acid_____ 25 cc.
Concentrated sulphuric acid_ 25 cc.
Trioxymethylene_____ 1 molar formaldehyde in respect to naphthalene The reaction is carried out preferably at a temperature of about 50° C., whereby the wax-substituted naphthalene is changed into a more viscous, resinous composition within a couple of hours. In the process of purification, the resinified product is freed of acid by taking up in a solvent such as carbon tetrachloride and washing with alkali, thereafter distilling off the solvent to give the finished pour point depressant product.

It will be understood, of course, that my invention is not restricted to the details of the specific example of my invention given above, but various changes may be made therein without departing from the true scope of my invention as set forth in the appended claims. Thus, I may use other resinifying agents in place of the trioxymethylene and other alkyl-substituted aromatic hydrocarbons, as defined above. I may also employ other solvents in place of the glacial acetic acid, such for example as chloroform, and other catalysts, such for example as concentrated hydrochloric acid or phosphoric acid.

The following table illustrates the effectiveness of the improved pour point depressants of this invention. The oil used in each instance is the same, and is a refined wax-containing petroleum lubricant oil having a viscosity of 249 seconds Saybolt universal at 130° F., and having an A. S. T. M. pour test of +20° F.

| Sample number | Concentration of depressor | A. S. T. M. pour test | |
|---|---|---|---|
| | | Alkyl-substituted aromatic hydrocarbon | Product of this invention |
| 1 | ½% | +15° F. | − 5° F. |
| 2 | ¼% | + 5° F. | −25° F. |

The unusual efficiency or effectiveness as pour point depressants of the novel resinified compounds of this invention over the first step condensation products is evident from the above examples.

It is understood that the terms "aromatic hydrocarbons", "chlorinated aliphatic hydrocarbons of relatively high molecular weights", "alkyl substituted aromatic hydrocarbons", and "resinifying agent", as used in the claims, shall mean respectively any substance or any mixture of substances falling within and being characteristic of said respective groups as defined herein.

I claim:
1. As a new composition of matter a hydrocarbon oil composition of low pour point comprising a hydrocarbon oil of normally high pour point, and in combination therewith a small proportion, sufficient to substantially reduce the pour point thereof, of a resinous condensation product of aromatic hydrocarbon material and aliphatic hydrocarbon material of relatively high molecular weight, condensed together and further condensed with a resinifying agent capable of resinifying the aromatic hydrocarbon material.

2. As a new composition of matter a hydrocarbon oil composition of low pour point comprising a hydrocarbon oil of normally high pour point, and in combination therewith a small proportion, sufficient to substantially reduce the pour point thereof, of a resinous condensation product of aromatic hydrocarbon material and chlorinated paraffin wax, condensed together and further condensed with a resinifying agent capable of resinifying the aromatic hydrocarbon material.

3. A lubricant oil of low pour point comprising a hydrocarbon lubricant of normally high pour point, and a small proportion of a product of resinous nature produced by first condensing together aromatic hydrocarbon material and chlorinated aliphatic hydrocarbon material of relatively high molecular weight and then condensing the product first obtained with a resinifying agent capable of resinifying the aromatic hydrocarbon material, said resinous product being present in sufficient quantity to depress substantially the pour point of the resulting mixture, but not in excess of 1%.

4. As a new composition of matter, a low pour point lubricating oil comprising a petroleum lubricant oil of relatively high pour point and in combination therewith a small proportion of a resinous condensation product of heavy alkyl substituted aromatic hydrocarbon material and a resinifying agent capable of resinifying the parent aromatic hydrocarbon material.

5. As a new composition of matter a lubricant oil composition of low pour point comprising a hydrocarbon lubricant oil of normally high pour point, and in combination therewith a small proportion of a resinous condensation product formed by first condensing together naphthalene and chlorinated paraffin wax in the presence of a material having the catalytic nature of aluminum chloride, and then further condensing the resulting material with an aldehyde compound capable of reacting with the naphthalene portion of the first product to form a resin.

6. As a new composition of matter a wax-containing petroleum oil in combination with a small proportion of an oil-miscible resinous material produced by first condensing chlorinated paraffin wax and an aromatic hydrocarbon selected from the group consisting of benzene, naphthalene, anthracene, diphenyl, phenanthene and fluorene, and then condensing the product so obtained with a resinifying agent capable of resinifying the aromatic hydrocarbon.

7. A method of lowering the pour point of a wax-containing petroleum oil which comprises adding thereto a small proportion of a resinous product produced by first condensing aromatic hydrocarbon material with chlorinated aliphatic hydrocarbon material of relatively high molecular weight, and then condensing the product so obtained with a resinifying agent capable of resinifying the aromatic hydrocarbon material.

8. The method of lowering the pour point of a wax-containing petroleum oil which comprises adding thereto a small proportion of an oil-miscible resinous material produced by first condensing aromatic hydrocarbon material and chlorinated aliphatic hydrocarbon material of relatively high molecular weight, and then condensing the product so obtained with trioxymethylene.

9. The method of lowering the pour point of a wax-containing petroleum oil which comprises adding thereto a small proportion of an oil-miscible resinous material produced by first condensing chlorinated aliphatic hydrocarbon material of relatively high molecular weight and an aromatic hydrocarbon selected from the group consisting of benzene, toluene, xylene, naphthalene, anthracene, diphenyl, phenanthene and fluorene, and then condensing the product so obtained with a resinifying agent capable of resinifying the aromatic hydrocarbon.

10. The method of lowering the pour point of wax-containing petroleum oil which comprises adding thereto a small proportion of an oil-miscible resinous material produced by first condensing together aromatic hydrocarbon material and chlorinated aliphatic hydrocarbon material of relatively high molecular weight, and then further condensing the product so obtained with a resinifying agent capable of resinifying the aromatic hydrocarbon material, the proportion of the chlorinated hydrocarbon material being not substantially less than that corresponding to the mono-substituted aromatic compound and not substantially greater than that corresponding to complete saturation of the said aromatic compound.

11. The method of lowering the pour point of a wax-containing petroleum oil which comprises adding thereto a small proportion of an oil-miscible resinous material produced by first condensing together aromatic hydrocarbon material and chlorinated aliphatic hydrocarbon material of relatively high molecular weight, and then further condensing the product so obtained with a resinifying agent capable of forming a resin with the aromatic hydrocarbon material, the proportion of chlorine in the chlorinated hydrocarbon material being between about 9% and 18%.

12. The method of lowering the pour point of a wax-containing petroleum oil which comprises adding thereto a small proportion of an oil-miscible resinous material produced by first condensing naphthalene with monochlorwax in the presence of a catalyst of the nature of aluminum chloride and then further condensing the product so obtained with a resinifying agent of the nature of trioxymethylene.

13. The method of lowering the pour point of a wax-containing petroleum oil which comprises adding thereto a small proportion of the oil-miscible resinous material produced by first condensing naphthalene with chlorinated aliphatic hydrocarbon material of relatively high molecular weight and then further condensing the product so obtained with trioxymethylene.

ORLAND M. REIFF.